MULTIVIBRATOR WITH LINEARLY VARIABLE
VOLTAGE CONTROLLED DUTY CYCLE

Filed Nov. 13, 1968

INVENTOR.
ORRIN H. GRANGAARD, JR.

BY Charles J. Ungemach

ATTORNEY 3,566,301

MULTIVIBRATOR WITH LINEARLY VARIABLE VOLTAGE CONTROLLED DUTY CYCLE

Orrin H. Grangaard, Jr., St. Paul, Minn., assignor to Honeywell Inc., Minneapolis, Minn., a corporation of Delaware Filed Nov. 13, 1968, Ser. No. 775,333
Int. Cl. H03k 3/282
U.S. Cl. 331—113 6 Claims

ABSTRACT OF THE DISCLOSURE

A multivibrator including two transistors and a timing capacitor, connected between the emitters of the transistors, which is charged with a constant current. The potentials at the transistor bases are established by controllable currents and determine the voltage to which the timing capacitor charges. By changing the voltage to which the constant current charges the capacitor, the duty cycle of the multivibrator is changed.

BACKGROUND OF THE INVENTION

The invention pertains to the field of solid state active element oscillators. More particularly the invention is directed to a transistorized relaxation oscillator of the multivibrator type.

SUMMARY

The invention is a free-running multivibrator providing a rectangular output voltage waveform of variable duty cycle. Voltage states of the multivibrator are changed thus changing the time constant associated with a timing capacitor. A differential control voltage varies the ratio of two currents $I_2$ and $I_3$, the sum of which is constant, and the voltage through which the timing capacitor is charged and discharged in a linear function of $I_2$ and $I_3$ depending on the state of the multivibrator. A triangular or sawtooth output voltage waveform is available across the timing capacitor. The shape of the triangular or sawtooth output depends upon the duty cycle.

DESCRIPTION OF THE PREFERRED EMBODIMENT

Figure 1:
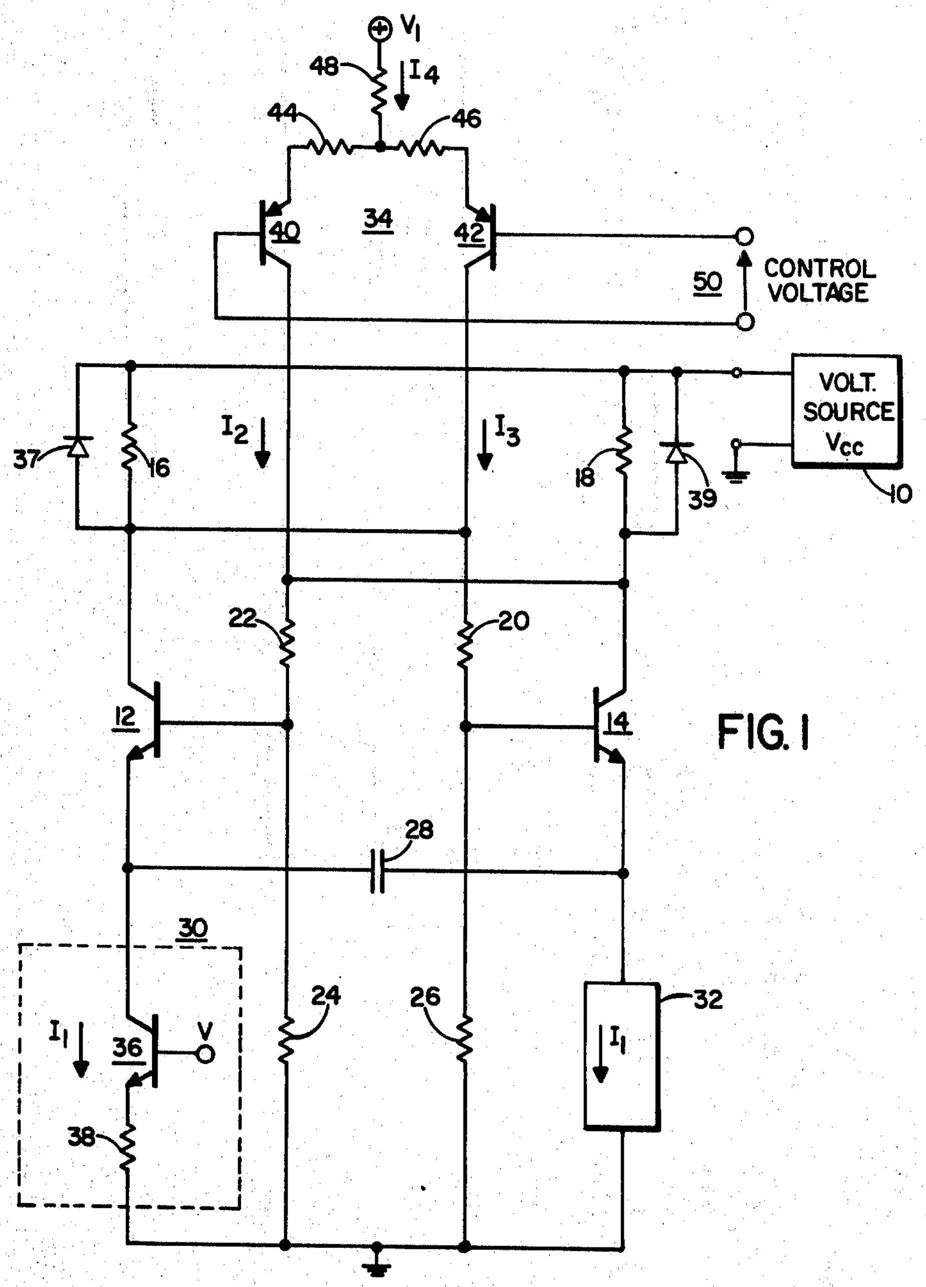
FIG. 1 is a schematic circuit diagram of a variable symmetry free-running multivibrator.
Figure 2:
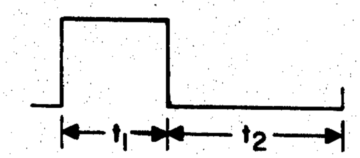
FIG. 2 is an output waveform of the multivibrator.

The multivibrator of FIG. 1 generates a rectangular waveform of fixed frequency and variable duty cycle. Duty cycle is the ratio of on to off times. The duty cycle is controlled linearly between 0 and 100% by an external signal.

The multivibrator includes an external voltage source 10. Source 10 has first and second terminals, the second terminal is connected to a reference potential point, for example, ground, and the potential at the first terminal with respect to ground is designated $V_{cc}$. The multivibrator also includes first and second switching elements 12 and 14. Each switching element has control, input and output terminals. A switching element conducts current between its input and output terminals when a predetermined potential is applied between its input and control terminals. As shown in the drawing, switching elements 12 and 14 are transistors. The control, input, and output terminals are the base, emitter, and collector electrodes, respectively. Resistors 16 and 18, each of the same resistance, are connected from the collector terminals of transistors 12 and 14, respectively, to the voltage $V_{cc}$. A resistor 20 is connected from the collector electrode of transistor 12 to the base electrode of transistor 14 and another resistor 22 is connected from the collector electrode of transistor 14 to the base electrode of transistor 12. Resistors 20 and 22 each have the same resistance. The resistance of resistors 20 and 22 is substantially greater than that of reistors 16 and 18. Resistors 24 and 26, each of the same resistance, are connected from the base electrodes of transistors 12 and 14, respectively, to ground. A timing capacitor 28 is connected between the emitter electrodes of transistors 12 and 14. A first constant current sink 30 and a second constant current sink 32 are connected between the emitter electrodes of transistors 12 and 14, respectively, and ground. A constant current $I_1$ flows into each of the sinks 30 and 32 regardless of the potential at the emitter terminals of transistors 12 and 14, respectively. Current sinks 30 and 32 are alike. Current sink 30 comprises a transistor 36 having collector, base, and emitter electrodes and a resistor 38 which is connected between the emitter electrode of transistor 36 and ground. The collector electrode of transistor 36 is connected to the emitter electrode of transistor 12. The base electrode of transistor 36 is connected to a source of potential V. Regardless of the potential at the collector electrode of transistor 36 a substantially constant current $I_1$ flows into the collector electrode and out the emitter electrode. In this sense, circuits 30 and 32 are referred to as constant current sinks.

A current source 34 provides second and third currents, $I_2$ and $I_3$, to the collector terminals of transistors 14 and 12 respectively. The sum of the currents $I_2$ and $I_3$ is constant and the ratio of $I_2$ and $I_3$ is variable. Current source 34 includes a pair of transistors 40 and 42. A pair of resistors 44 and 46, each having the same resistance, are connected in series between the emitter electrodes of transistors 40 and 42. Another resistor 48 is connected from a source of potential $V_1$ to a point common to resistors 44 and 46. A control voltage 50 is connected between the base electrodes of transistors 40 and 42. The current flowing out of the collector of transistor 40 is designated $I_2$ and the current flowing out of the collector of transistor 42 is designated $I_3$. The current flowing into the junction point between resistors 44 and 46 is designated $I_4$ and is constant.

Diodes 37 and 39 are connected across resistors 16 and 18 respectively. The purpose of diodes 37 and 39 is to shunt current around their associated resistors. Diode 37 shunts substantially all of the current $I_3$ around resistor 16 when transistor 14 is conducting. Diode 39 shunts the current $I_2$ around resistor 18 when transistor 12 is conducting.

If diodes 37 and 39 and transistors 40 and 42 are removed the remaining circuitry describes a standard form of a free-running multivibrator commonly called a current-coupled, non-saturated multivibrator which has certain advantages, such as, fast rise and fall times, good rejection of supply voltage variations, good frequency stability with temperature changes, and positive starting action because of the non-saturated positive feedback circuitry employed. Furthermore with this standard multivibrator, there is available either a square wave voltage output at the collectors of transistors 12 and 14 or a triangular voltage waveform taken across capacitor 28.

In operation the transistors 12 and 14 are alternately conducting and non-conducting. It will be assumed that resistors 20, 22, 24, and 26 all have the same resistance $R_2$. If $I_2=I_3=0$ the potential at the base of the conducting transistor is about $V_{CC}/2$ and the potential at the base of the non-conducting transistor is $(V_{CC}-2I_1R_1)/2$, where $R_1$ is the resistance of each resistor 16 and 18. The multivibrator has two states, one state when transistor 12 is conducting and transistor 14 is non-conducting and another state when transistor 12 is non-conducting and transistor 14 is conducting. The transition time it takes to go from one state to the other is determined solely by the difference in the two allowable voltage states at the base electrodes of transistors 12 and 14 and the linear charging time constant formed by current $I_1$ and the capacity C of capacitor 28. The potential at the emitters of transistors 12 and 14 when they are conducting is about equal to the potential at their bases. The difference between the two allowable voltage states is $I_1R_1$. The addition of currents $I_2$ and $I_3$ does not affect the allowable high voltage state $V_{CC}/2$ because of the action of diodes 37 and 39. The allowable low voltage state does change however and it becomes $$V_{CC}-2I_1R_1+I_2R_1)/2$$

The current $I_3$ is shunted by diode 37. It is assumed that transistor 14 is conducting and that transistor 12 is non-conducting. The current $I_2$ can equal $I_3$ or zero. The difference in the base voltage between the high and the low voltage states is $(I_1R_1)-I_2R_1/2$. This is assuming that the resistance $R_1$ is much less than $R_2$. The change in voltage which occurs across capacitor 28 when the circuit changes from one state to the other is $2I_1R_1-I_2R_1$. It is seen, therefore, that the voltage through which capacitor 28 is linearly discharged and charged by current $I_1$ is a linear function of $I_2$ or $I_3$ depending upon which transistor 14 or 12, is conducting. The application of control voltage 50 linearly varies the ratio of currents $I_2$ and $I_3$. $I_2+I_3=I_4$=a constant. The control voltage 50 which is differentially applied to the bases of transistors 40 and 42 is therefore linearly controlling the duty cycle of the multivibrator.

The voltage appearing across capacitor 28 is equal to $$\frac{1}{C}\int idt=I_1t/C$$

where C is the capacitance of capacitor 28. The time during which transistor 14 is conducting is designated $t_1$ and is equal to $R_1C(2-I_2/I_1)$. The time transistor 12 is conducting is designated $t_2$ and is equal to $R_1C(2-I_3/I_1)$. The period of the multivibrator is $t_1+t_2$ and is equal to $R_1C(4-I_4/I_1)$. The duty cycle is $t_1/(t_1+t_2)$ and is equal to $B(2-I_2A)$ where B is equal to $1/(4-I_4/I_1)$ and A is equal to $1/I_1$. From these equations it can be seen that the period of the circuit is a function of only the circuit constants whereas the duty cycle is a linear function of current $I_2$ which in turn is a linear function of the control voltage 50. The resistors 44 and 46 in the emitter circuits of transistors 40 and 42, respectively, establish the sensitivity of the circuit. Integrated circuit technology can be readily used in implementing this circuit.

The embodiment shown and described is the preferred embodiment but other embodiments may be improvised by those skilled in the art.

1. A multivibrator with a linearly variable duty cycle, comprising:

a source of voltage having first and second terminals, the second terminal connected to a potential reference point, the first terminal at a potential $V_{CC}$ volts;

first and second switching elements, each having control, input, and output terminals, a switching element conducting current between its input and output terminals whenever there is applied to its control terminal a predetermined potential with respect to that at its input terminal;

first and second impedances each of the same impedance $Z_1$ ohms connected from the output terminals of the first and second switching elements, respectively to the first terminal of the voltage source;

a third impedance of impedance $Z_2$ ohms connected between the output terminal of the first switching element and the control terminal of the second switching element, $Z_2$ being substantially greater than $Z_1$;

a fourth impedance of impedance $Z_2$ ohms connected between the output terminal of the second switching element and the control terminal of the first switching element;

fifth and sixth impedances of impedance $Z_2$ ohms connected between the control terminals of the first and second switching elements, respectively, and the potential reference point;

a timing capacitor of capacitance C connected between the input terminals of the switching elements;

first and second constant current sinks connected between the input terminals of the first and second switching elements, respectively, and the potential reference point, a constant current $I_1$ flowing into the sinks regardless of the potential at the input terminals of the switching elements;

means for providing second and third currents, $I_2$ and $I_3$, to the output terminals of the second and first switching elements, respectively, the sum $I_2+I_3$ being constant and the ratio $I_2/I_3$ being variable; and, first and second current shunting means connected across the first and second impedances respectively, the first shunting means shunting substantially all the third current $I_3$ around the first impedance when the second switching element is conducting, the second shunting means shunting the second current $I_2$ around the second impedance when the first switching element is conducting.

2. The circuit of claim 1 wherein the impedances are resistors of resistance $R_1$ and $R_2$ ohms for the impedances $Z_1$ and $Z_2$ respectively.

3. The circuit of claim 1 wherein the switching elements are transistors each having base, emitter, and collector electrodes for the control, input, and output terminals, respectively.

4. The apparatus of claim 1 wherein each of the current sinks comprises a transistor, a voltage source, V, and a resistor, the collector of the transistor connected to the input terminal of a switching element, the base connected to the potential V, and the emitter connected to the refeernce potential through the resistor.

5. The apparatus of claim 1 wherein the current shunting means are diodes.

6. The apparatus of claim 1 wherein the means for providing the currents $I_2$ and $I_3$ comprises a pair of transistors, a pair of equal resistors connected in series between the transistor emitters, another resistor connected from a point common to the series resistors to a voltage potential $V_1$, each transistor collector connected to the output terminal of a switching element, and a control voltage source connected between the transistor bases.

References Cited

UNITED STATES PATENTS

| | | | |
|---|---|---|---|
| 3,037,172 | 5/1962 | Biard | 331—113X |
| 3,076,152 | 1/1963 | Biard et al. | 331—113 |
| 3,249,893 | 5/1966 | Castellano, Jr. | 331—113 |

ROY LAKE, Primary Examiner

S. H. GRIMM, Assistant Examiner

U.S. Cl. X.R.

331—144; 332—14